US009865041B2

(12) United States Patent
Suzuki

(10) Patent No.: US 9,865,041 B2
(45) Date of Patent: Jan. 9, 2018

(54) IMAGE PROCESSING APPARATUS, IMAGING APPARATUS, IMAGE PROCESSING METHOD, AND COMPUTER-PROCESSABLE NON-TRANSITORY STORAGE MEDIUM

(71) Applicant: OLYMPUS CORPORATION, Hachioji-shi, Tokyo (JP)

(72) Inventor: Hiroshi Suzuki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/232,004

(22) Filed: Aug. 9, 2016

(65) Prior Publication Data

US 2016/0350899 A1 Dec. 1, 2016

Related U.S. Application Data

(63) Continuation of application No. PCT/JP2015/053510, filed on Feb. 9, 2015.

(30) Foreign Application Priority Data

Feb. 10, 2014 (JP) ................................. 2014-023644

(51) Int. Cl.
*G06K 9/00* (2006.01)
*G06T 5/00* (2006.01)
(Continued)

(52) U.S. Cl.
CPC ................ *G06T 5/009* (2013.01); *G06T 5/40* (2013.01); *G06T 7/0002* (2013.01);
(Continued)

(58) Field of Classification Search
CPC ........... G06T 5/009; G06T 5/40; G06T 5/001; G06T 5/005; G06T 2207/20008;
(Continued)

(56) References Cited

U.S. PATENT DOCUMENTS 6,038,266 A * 3/2000 Lee ................... H04L 25/03038
375/317
6,111,607 A * 8/2000 Kameyama ............. G06T 5/009
348/255
(Continued)

FOREIGN PATENT DOCUMENTS

JP 2010-152536 7/2010
JP 2011-175608 9/2011
(Continued)

OTHER PUBLICATIONS

International Preliminary Report on Patentability to corresponding International Patent Application No. PCT/JP2015/053510, dated Aug. 25, 2016. (14 pgs.).

(Continued)

*Primary Examiner* — Amir Alavi
(74) *Attorney, Agent, or Firm* — John C. Pokotylo; Pokotylo Patent Services

(57) ABSTRACT

An image processing apparatus includes a degree-of-degradation detector, a correction coefficient calculator and an adaptive gradation correction unit. The degree-of-degradation detector detects a degree of degradation of image quality for each of areas included in image data and having predetermined size. The correction coefficient calculator calculates a correction coefficient for gradation correction, for each of the areas of the image data. The adaptive gradation correction unit performs adaptive gradation correction appropriate to the degree of degradation of the image data, based on the degree of degradation detected by the degree-of-degradation detector and the correction coefficient calculated by the correction coefficient calculator.

16 Claims, 10 Drawing Sheets

(51) Int. Cl.
*G06T 5/40* (2006.01)
*G06T 7/00* (2017.01)
*H04N 1/407* (2006.01)
*H04N 5/232* (2006.01)

(52) U.S. Cl.
CPC . *H04N 1/4074* (2013.01); *G06T 2207/20008* (2013.01); *G06T 2207/30168* (2013.01); *H04N 5/23229* (2013.01)

(58) Field of Classification Search
CPC ........ G06T 2207/10024; H04N 1/6027; H04N 1/60; H04N 9/045
See application file for complete search history.

(56) References Cited

U.S. PATENT DOCUMENTS

| | | | |
|---|---|---|---|
| 2007/0047019 A1* | 3/2007 | Toyoda | H04N 1/40068 358/448 |
| 2009/0123067 A1* | 5/2009 | Kuniba | G06T 5/009 382/167 |
| 2011/0317936 A1 | 12/2011 | Takamura | |
| 2013/0329094 A1* | 12/2013 | Ranalli | H04N 5/265 348/241 |
| 2015/0243002 A1* | 8/2015 | Hirooka | G06T 5/008 348/241 |
| 2016/0100122 A1* | 4/2016 | Nakajima | H04N 9/73 348/687 |
| 2016/0350899 A1* | 12/2016 | Suzuki | G06T 5/009 |

FOREIGN PATENT DOCUMENTS

| | | |
|---|---|---|
| JP | 2012-027547 | 2/2012 |
| JP | 2012-054659 | 3/2012 |

OTHER PUBLICATIONS

Office Action to corresponding Japanese Patent Application No. 2014-023644, dated Nov. 4, 2015 (5 pgs.), with translation (7 pgs.).

He, et al, "Single Image Haze Removal Using Dark Channel Prior," *IEEE Transactions on Pattern Analysis and Machine Intelligence*, vol. 33 No. 12, pp. 2341-2353 (IEEE Computer Society Dec. 2011).

International Search Report to International Application No. PCT/JP2015/053510, dated May 19, 2015 (3 pgs.), with translation (2 pgs.).

Supplementary European Search Report to European Application No. 15746265.6-1906, dated on Aug. 17, 2017 (2 pgs.), with cover p. (1 pg.) and Annex to The European Search Report (5 pgs.).

Agaian et al, "New Haze Removal Scheme and Novel Measure of Enhancement," *2013 IEEE International Conference on Cybernetics (CYBCO)*, pp. 219-224 (IEEE, Jun. 13, 2013).

Xu et al, "Fog Removal from Color Images using Contrast Limited Adaptive Histogram Equalization," *2009 2nd International Congress on Image and Signal Processing*, pp. 1-5, (IEEE, Oct. 17, 2009).

Kim et al, "Optimized Contrast Enhancement for Real-Time Image and Video Dehazing," *Journal of Visual Communication and Image Representation*, vol. 24 No. 3, pp. 410-425 (Feb. 18, 2013).

* cited by examiner

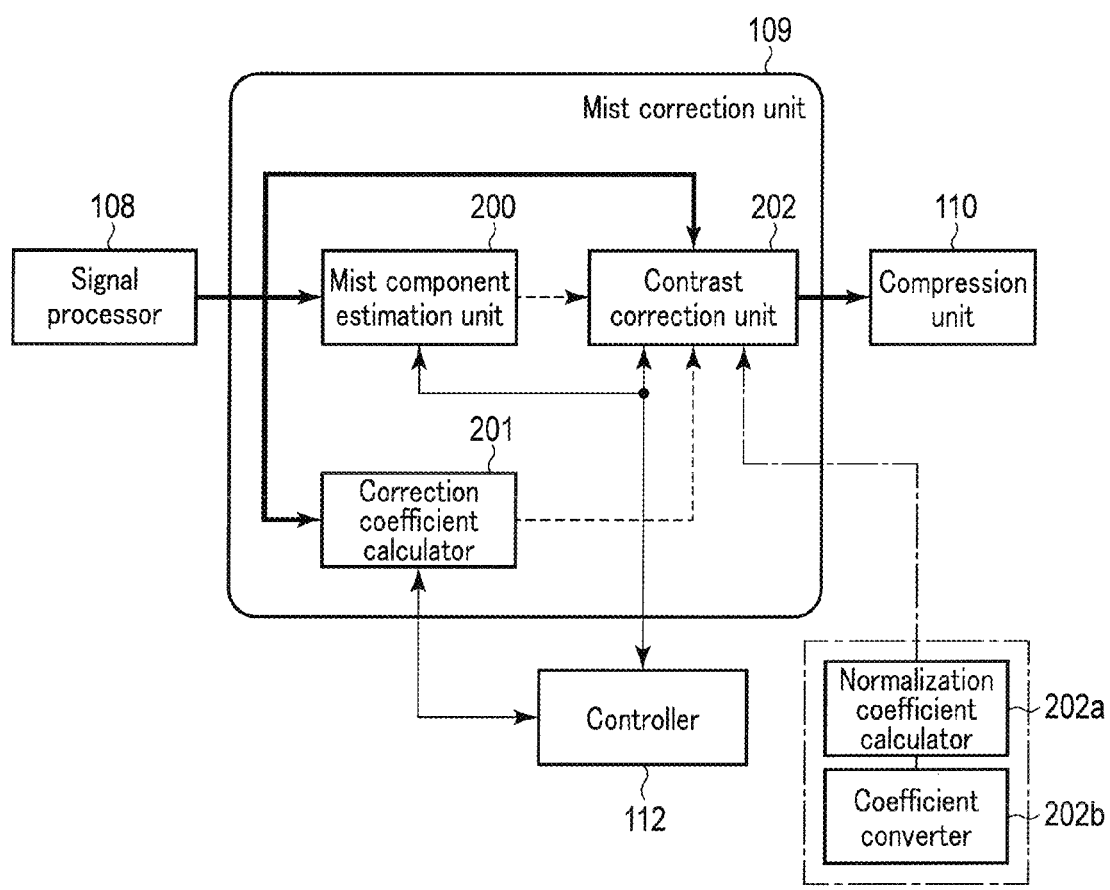
F I G. 2

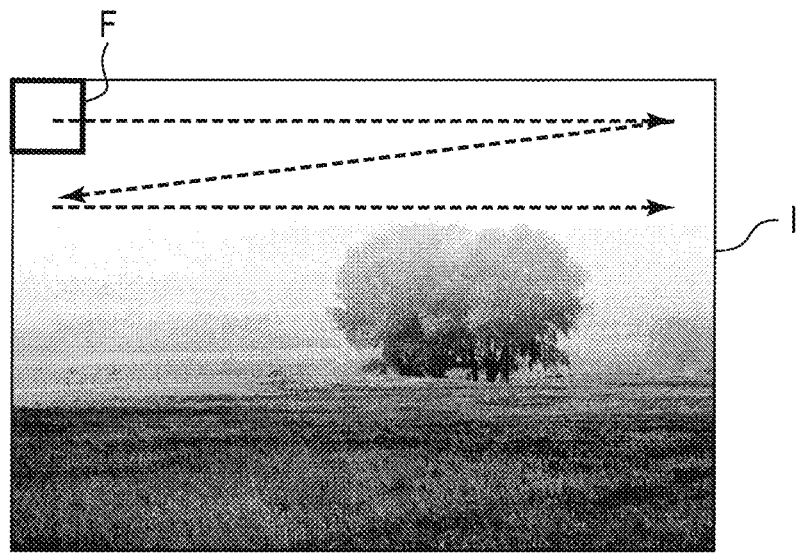
F I G. 3A
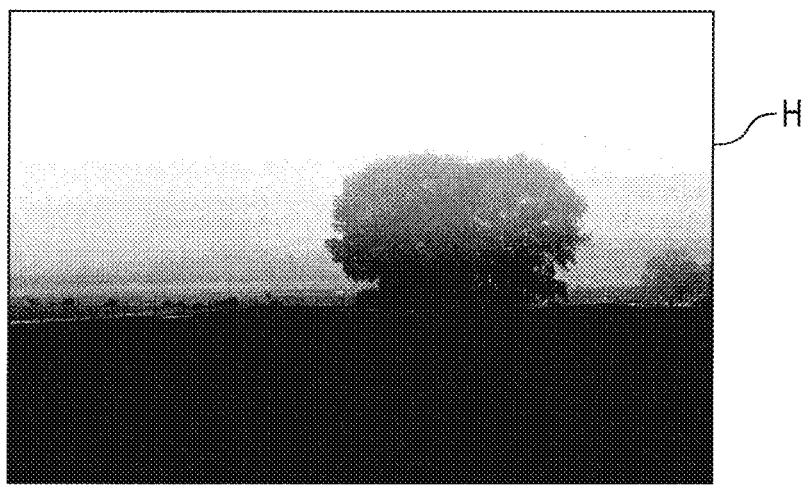
F I G. 3B

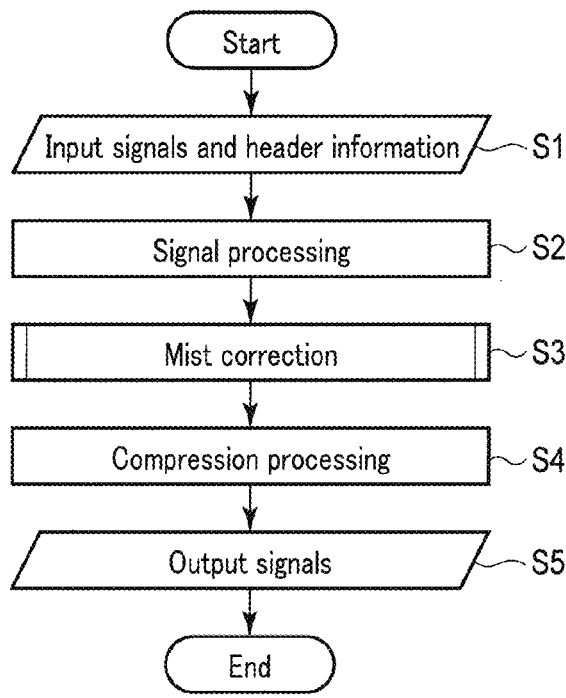
F I G. 6
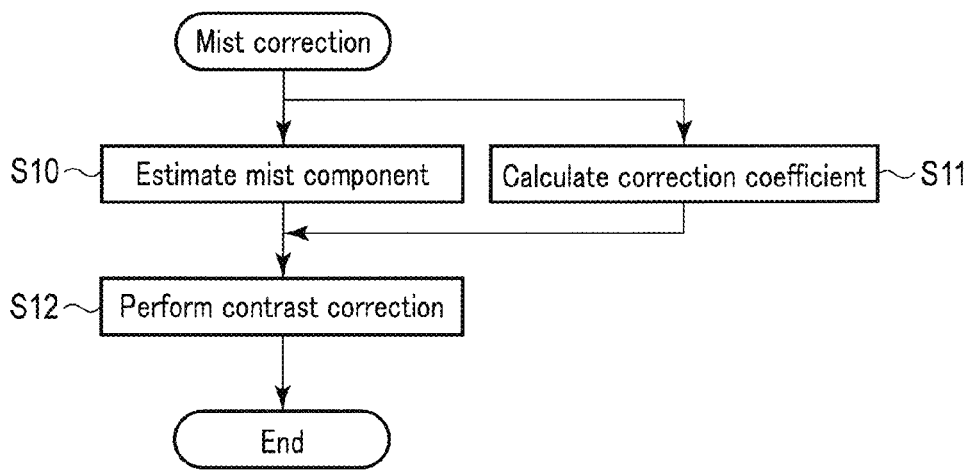
F I G. 7

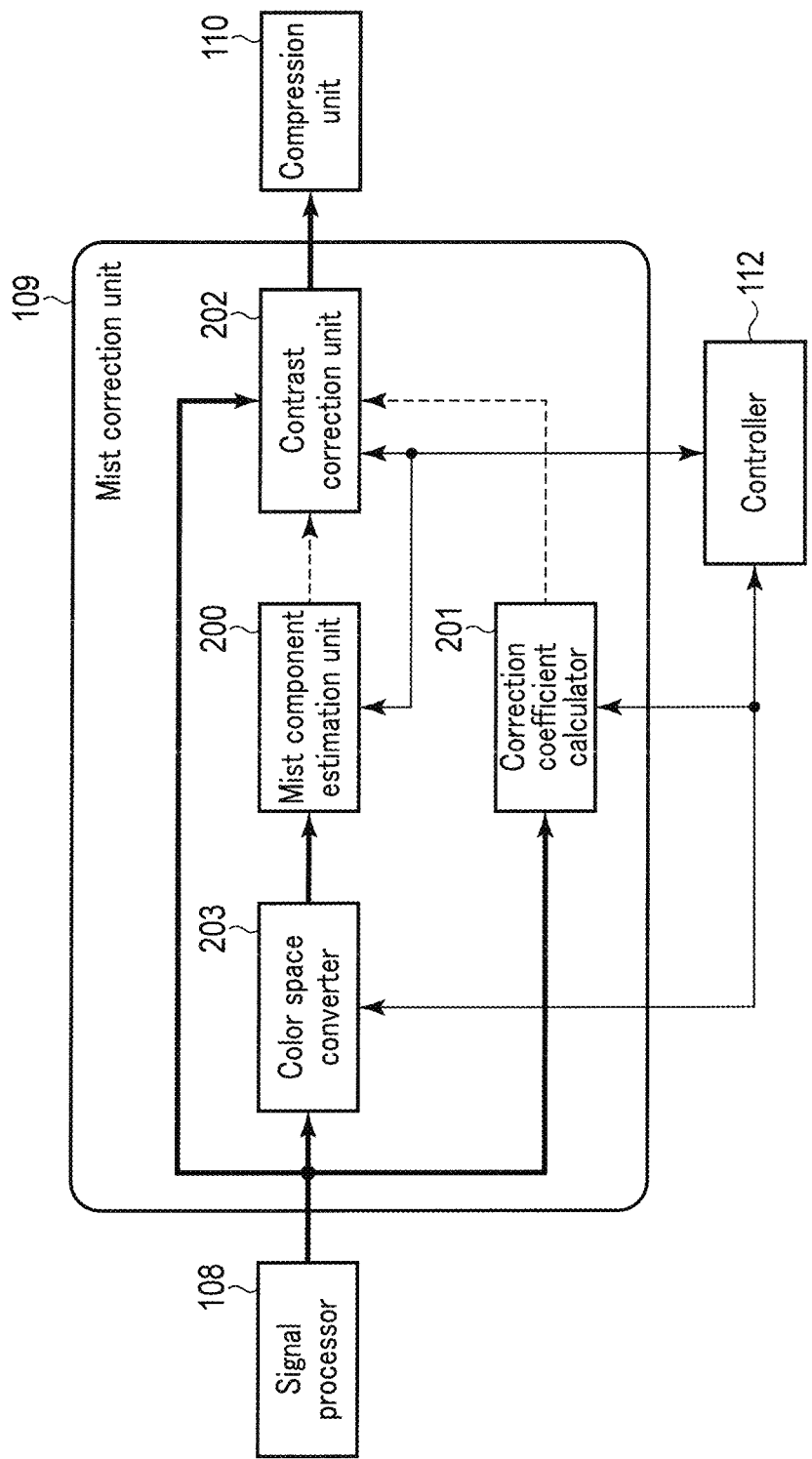
F I G. 8

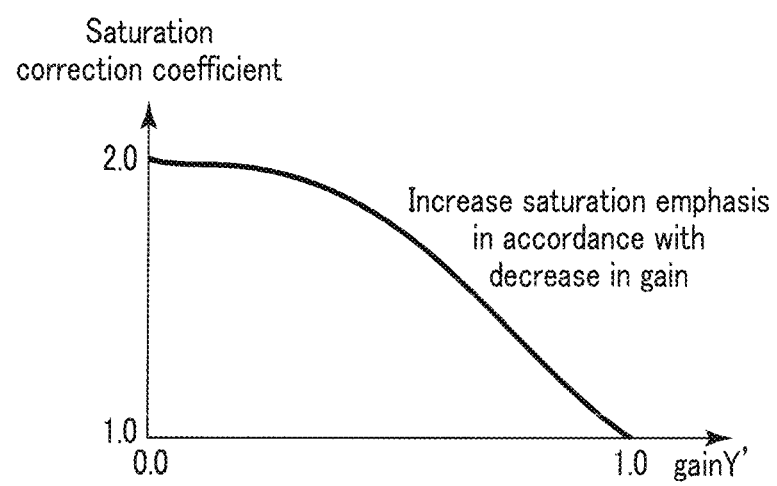
F I G. 12

IMAGE PROCESSING APPARATUS, IMAGING APPARATUS, IMAGE PROCESSING METHOD, AND COMPUTER-PROCESSABLE NON-TRANSITORY STORAGE MEDIUM

CROSS-REFERENCE TO RELATED APPLICATIONS

This application is a Continuation Application of PCT Application No. PCT/JP2015/053510, filed Feb. 9, 2015 and based upon and claiming the benefit of priority from the prior Japanese Patent Application No. 2014-023644, filed Feb. 10, 2014, the entire contents of both of which are incorporated herein by reference.

BACKGROUND OF THE INVENTION

1. Field of the Invention

The present invention relates to an image processing apparatus, an image processing method, an image processing program and an imaging apparatus, which correct an image whose image quality, including contrast and colors, is impaired by the haze, fog, or the like.

2. Description of the Related Art

The image quality of an image, including contrast and colors, may be impaired by the haze or fog generated in the atmosphere. For example, a landscape photograph of a distant mountain may be taken outdoors. If the distant mountain is in mist, the photographed image is degraded by the mist, and the distant mountain may not be clearly recognized in the photograph.

Jpn. Pat. Appln. KOKAI Publication No. 2012-054659 and Jpn. Pat. Appln. KOKAI Publication No. 2010-152536 (Japanese Patent No. 4982475) propose technology for solving the problem. According to Jpn. Pat. Appln. KOKAI Publication No. 2012-054659, a maximal brightness value and a minimal brightness value are calculated based on an image, and contrast correction is made in such a manner as to increase the difference between the calculated maximal and minimal brightness values, thereby improving the recognizability of the image. If the image of the photograph is entirely in mist, the technique disclosed in Jpn. Pat. Appln. KOKAI Publication No. 2012-054659 can satisfactorily improve the recognizability of the image.

According to Jpn. Pat. Appln. KOKAI Publication No. 2010-152536, a maximal brightness value and a minimal brightness value are calculated for each of local areas of an image, and adaptive contrast correction is made in such a manner as to increase the difference between the calculated maximal and minimal brightness values. Jpn. Pat. Appln. KOKAI Publication No. 2010-152536 enables sufficient contrast correction to be made to improve the recognizability of the image even if the image includes both a mist portion and a non-mist portion.

BRIEF SUMMARY OF THE INVENTION

An image processing apparatus according to a first aspect of the invention comprises: a degree-of-degradation detector which detects a degree of degradation of image quality for each of areas included in image data and having predetermined size; a correction coefficient calculator which calculates a correction coefficient for gradation correction, for each of the areas of the image data; and an adaptive gradation correction unit which performs adaptive gradation correction appropriate to the degree of degradation of the image data, based on the degree of degradation detected by the degree-of-degradation detector and the correction coefficient calculated by the correction coefficient calculator, wherein the correction coefficient calculator calculates, as the correction coefficient, a gain coefficient for contrast emphasis for a pixel of interest of the image data, and wherein the adaptive gradation correction unit weights the correction coefficient calculated by the correction coefficient calculator, based on the degree of degradation detected by the degree-of-degradation detector, the correction coefficient being weighted such that the larger the degree of degradation is, the closer to an original value the gain coefficient becomes, and such that the smaller the degree of degradation is, the smaller an effect of the adaptive gradation correction becomes.

An image processing method according to a second aspect of the invention comprises: detecting a degree of degradation of image quality for each of areas included in image data and having predetermined size; calculating, as a correction coefficient, a gain coefficient for contrast emphasis for a pixel of interest of the image data; and performing adaptive gradation correction appropriate to the degree of degradation of the image data, by weighting the correction coefficient based on the degree of degradation and the correction coefficient, the correction coefficient being weighted such that the larger the degree of degradation is, the closer to an original value the gain coefficient becomes, and such that the smaller the degree of degradation is, the smaller an effect of the adaptive gradation correction becomes.

A computer-processable non-transitory storage medium according to a third aspect of the invention stores an image processing program that causes a computer to perform: a degree-of-degradation detecting function of detecting a degree of degradation of image quality for each of areas included in image data and having predetermined size; a correction coefficient calculating function of calculating, as a correction coefficient, a gain coefficient for contrast emphasis for a pixel of interest of the image data; and adaptive gradation correction function of performing adaptive gradation correction appropriate to the degree of degradation of the image data, by weighting the correction coefficient based on the degree of degradation and the correction coefficient, the correction coefficient being weighted such that the larger the degree of degradation is, the closer to an original value the gain coefficient becomes, and such that the smaller the degree of degradation is, the smaller an effect of the adaptive gradation correction becomes.

An imaging apparatus according to a forth aspect of the invention comprises an imaging element which forms an optical image of an object, an image processing apparatus as defined in the first aspect, the image processing apparatus being configured to detect a degree of degradation of image quality of image data obtained by the imaging element, and to perform adaptive gradation correction in accordance with the degree of gradation of the image data, and an output unit which outputs the image data subjected to the gradation correction performed by the image processing apparatus.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a specific block diagram illustrating the mist correction unit of the imaging apparatus;

FIG. 3A is a schematic diagram of an input image and illustrates how the imaging apparatus estimates a mist component H(x,y) of each of the pixels of the input image;

FIG. 3B illustrates a mist component H(x,y) which is processed when an image is formed based on min(Ir, Ig, Ib) for each of pixels of interest;

FIG. 6 is a flowchart illustrating a photographing operation performed by the imaging apparatus;

FIG. 7 is a flowchart illustrating a mist component correction operation performed by the imaging apparatus;

FIG. 8 is a specific block diagram illustrating the mist correction unit of an imaging apparatus according to the second embodiment of the present invention;

FIG. 12 is a graph illustrating how a saturation correction coefficient used in the color correction unit of the imaging apparatus is determined.

DETAILED DESCRIPTION OF THE INVENTION

First Embodiment

The first embodiment of the present invention will now be described with reference to the accompanying drawings.

Figure 1:
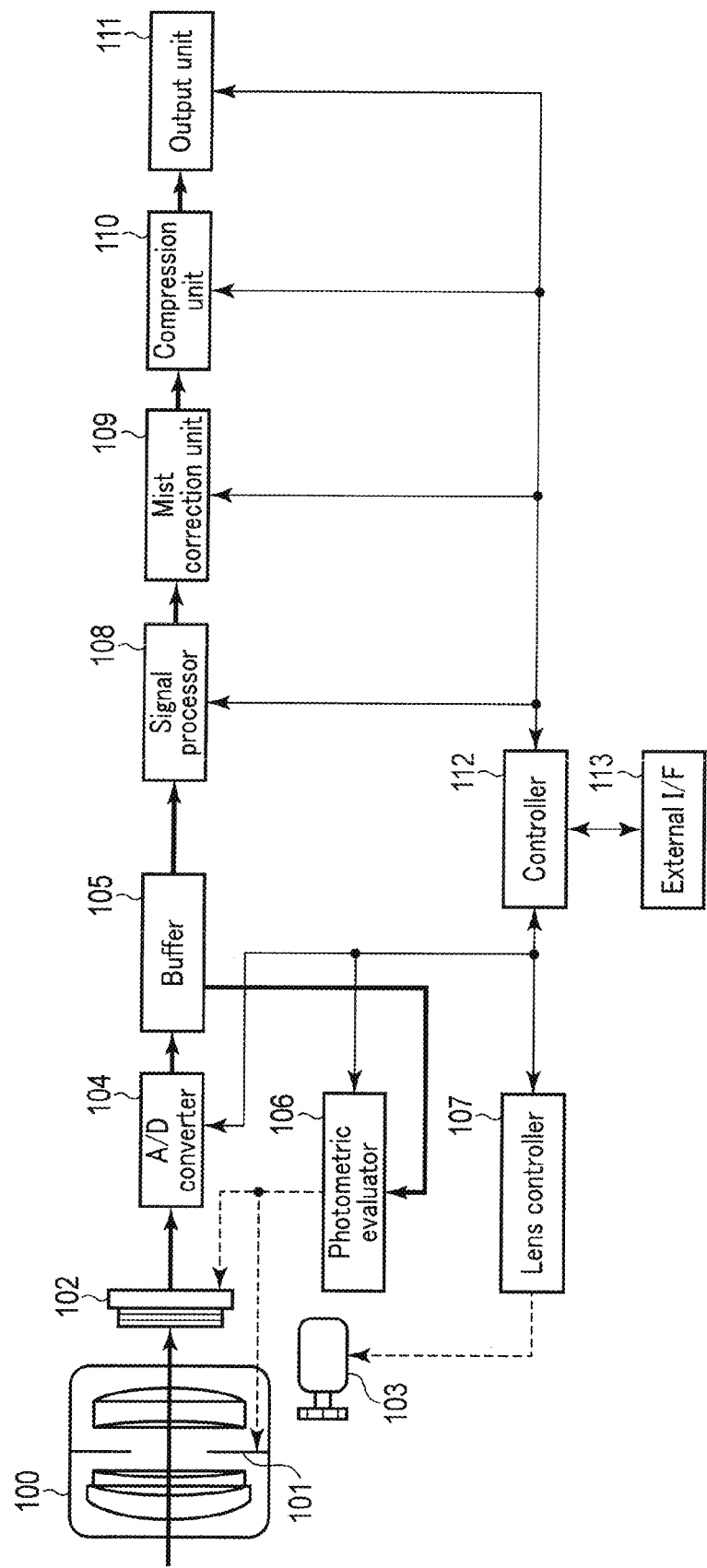
FIG. 1 is a block diagram illustrating an imaging apparatus to which an image processing apparatus according to the first embodiment of the present invention is applied.

FIG. 1 is a block diagram illustrating an imaging apparatus to which an image processing apparatus is applied. In FIG. 1, the thick-solid-line arrows indicate how an image signal is supplied, the thin-solid-line arrows indicate how a control signal is supplied, and the broken-line arrows indicate how other signals are supplied. The same holds true of FIGS. 2, 8 and 11 as well.

A lens system 100 includes a focusing lens, an aperture 101, etc. The lens system 100 forms an optical image of an object on an image sensor 102. The lens system 100 includes an autofocus motor (AF motor) 103. A lens controller 107 is connected to the AF motor 103. The lens controller 107 controls the driving of the AF motor 103. As a result, the lens system 100 moves the focusing lens in the optical axis direction of the lens system 100 in accordance with the driving of the AF motor 103.

The image sensor 102 is on the optical axis of the lens system 100. The image sensor 102 receives an optical image from the lens system 100, performs photoelectric conversion for the optical image, and outputs RGB analog image signals. A buffer 105, a signal processor 108, a mist correction unit 109, a compression unit 110 and an output unit 111 are connected to the output terminal of the image sensor 102 by way of an A/D converter 104.

The A/D converter 104 converts an RGB analog image signal output from the image sensor 102 into an RGB digital image signal.

The buffer 105 temporarily stores the digital image signal supplied from the A/D converter 104.

A photometric evaluator 106 controls the aperture 101 of the lens system 100 based on the brightness information on the digital image signal stored in the buffer 105 and a control signal output from the controller 112. By so doing, the photometric evaluator 106 adjusts the output level of the analog image signal output from the image sensor 102.

The signal processor 108 performs image processing for the digital image signal stored in the buffer 105, including known interpolation processing, WB correction processing and noise reduction processing. The digital image signal subjected to the image processing is supplied to the mist correction unit 109.

The mist correction unit 109 receives the digital image signal supplied from the signal processor 108 and performs contrast emphasis correction for the digital image signal such that the contrast of a low-contrast portion caused by the mist or the like is emphasized. The mist correction unit 109 supplies the digital image signal subjected to the correction to the compression unit 110.

FIG. 2 is a specific block diagram illustrating an example of the mist correction unit 109. The mist correction unit 109 includes a mist component estimation unit (degradation detector) 200, a correction coefficient calculator 201, and a contrast correction unit (adaptive gradation correction unit) 202. A digital image signal output from the signal processor 108 is supplied to each of the mist component estimation unit 200, correction coefficient calculator 201, and contrast correction unit 202. The operations of the mist component estimation unit 200, correction coefficient calculator 201 and contrast correction unit 202 are controlled by the controller 112. A mist component estimated by the mist component estimation unit 200 and a correction coefficient calculated by the correction coefficient calculator 201 are supplied to the contrast correction unit 202.

The mist component estimation unit 200 receives a digital image signal supplied from the signal processor 108 and estimates the gradations of such components as would likely to degrade the image quality of the image data obtained from the digital image signal. A factor that degrades the image quality of the image data is represented as a degree of degradation. In other words, the degree of degradation is a factor which impairs the image quality of the image data (including the contrast and colors) and which therefore degrades the recognition performance of an image. The degree of degradation includes, for example, the gradations of a mist component, a haze component or a cloud component which are included in image data and are likely to degrade the image quality.

The degree of degradation caused by a mist component is estimated based on the feature of the mist component, namely, the mist component has a high brightness and a low saturation. In other words, the higher the brightness is and the lower the saturation is, the higher will be the degree of degradation.

In the estimation of the degree of degradation, the color channels at each pixel of image data are compared with each other. Namely, the R values are compared with each other, the G values are compared with each other, and B values are compared with each other, so as to obtain a minimal R value, a minimal G value and a minimal B value.

To be more specific, the mist component estimation unit 200 receives a digital image signal from the signal processor 108, acquires image data (hereinafter referred to as input image I) from the digital image signal, detects the R value, G value and B value at each pixel in the coordinates (x,y) of the input image I, and estimates the mist component of each pixel (the effect which the mist has on each pixel, the density of the mist, etc.).

Let us assume that in input image I obtained from the digital image signal supplied from the signal processor 108, the mist component at coordinates (x,y) is H(x,y), and the R value, G value and B value at coordinates (x,y) are Ir, Ig and Ib, respectively, the mist component H(x,y) at each pixel of the coordinates (x,y) can be estimated based on the minimal values min(Ir, Ig, Ib) of Ir, Ig and Ib, as shown in formula (1):

$$H(x,y) = \min(Ir, Ig, Ib) \quad (1)$$

FIG. 3A is a schematic diagram of an input image I and illustrates how a mist component H(x,y) at each pixel is estimated. A scan area (small area) F having a predetermined matrix size (n×m) (n, m: natural numbers) is determined for the mist component estimation unit 200 beforehand. The scan area F has a matrix pattern of 5×5 pixels, for example. The center of the matrix is a pixel of interest in the scan area F. The scan area F may be constituted by one pixel, for example.

The mist component estimation unit 200 scans the scan area F of the input image I, for each of the pixels. When the scan area F is scanned, the mist component estimation unit 200 calculates min(Ir, Ig, Ib) for each of the pixels of interest of the input image I, and regards the calculated min(Ir, Ig, Ib) as a mist component H(x,y).

To be more specific, when the scan area F is scanned, the mist component estimation unit 200 calculates min(Ir, Ig, Ib) in the matrix of n×m pixels including the pixel of interest in the scan area F, and this calculation is carried out for each of the pixels of the input image I. That is, the mist component estimation unit 200 calculates min(Ir, Ig, Ib) for all pixels in the scan area F. In addition, the mist component estimation unit 200 calculates further minimal values min(Ir, Ig, Ib) of each min(Ir, Ig, Ib), and regards the min(Ir, Ig, Ib) as the mist component H(x,y) of the pixels of interest (H(x,y)=min(Ir, Ig, Ib)). The mist component estimation unit 200 scans the scan area F with respect to the entire input image I, and calculates mist component H(x,y) for each of the pixels of the input image I ((H(x,y)=min(Ir, Ig, Ib)).

The mist component estimation unit 200 calculates the mist component H(x,y) of a pixel of interest as the degree of degradation of the pixel of interest or as the degree of degradation of the scan area F. As will be described later, the larger the mist component H(x,y) is, the higher the degree of degradation is.

FIG. 3B illustrates a mist component H(x,y) which is processed when an image is formed based on min(Ir, Ig, Ib) for each of pixels of interest. In the image data of mist component H(x,y), the pixel values of an area having a high brightness and a low saturation are featured in that the R value, the G value and the B value are large and equal to each other. As a result, min(Ir, IG, Ib) on the right side of formula (1), which represents the mist component H(x,y), takes on a large value. That is, the mist component H(x,y) takes on a large value in a region having a high brightness and a low saturation. In other words, the degree of degradation can be regarded as being high in that region.

With respect to the pixel values of a region having a low brightness and a high saturation, one of the R value, G value and B value is small, and the value of the min(Ir, Ig, Ib) is small, accordingly. In other words, in a region having a low brightness and a high saturation, the mist component H(x,y) takes on a small value. In other words, the degree of degradation can be regarded as being low in that region.

Therefore, the mist component H(x,y) has the following feature: The mist component H(x,y) takes on a larger value in accordance with an increase in the mist density, and the degree of degradation increases, accordingly. The mist component H(x,y) takes on a smaller value in accordance with a decrease in the mist density, and the degree of degradation decreases, accordingly.

When the scan area F is being scanned for input image I, the correction coefficient calculator 201 calculates a correction coefficient (a gain coefficient) for gradation correction, with respect to each of the pixels of the input image I. The correction coefficient calculator 201 calculates a correction coefficient for contrast emphasis with respect to a low-contrast region of the input image I. The correction coefficient calculator 201 calculates the correction coefficient without reference to the mist component H(x,y).

To be more specific, the correction coefficient calculator 201 determines a local area E beforehand. The local area E is formed as a matrix having a predetermined size k×l (k,l: natural numbers). The center of the matrix is a pixel of interest in the local area E.

Figure 4A:
FIG. 4A illustrates how each local area of an input image is scanned when the input image is obtained by the correction coefficient calculator of the imaging apparatus.
Figure 4B:
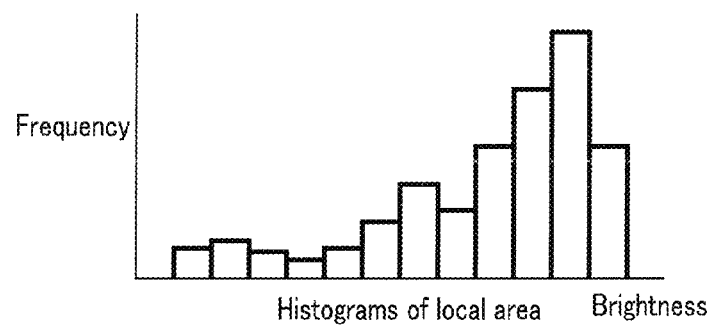
FIG. 4B is a local area histogram generated by the correction coefficient calculator of the imaging apparatus.

The correction coefficient calculator 201 scans the inside region of the local area E of the input image I, as shown in FIG. 4A. By scanning the inside region of the local area E of the input image I, the correction coefficient calculator 201 generates histograms (local area histograms) of the R value, G value and B value of the local area E, the center of which is a pixel of interest, as shown in FIG. 4B. The histograms are generated for each of the pixels of interest. In the histogram shown in FIG. 4B, the abscissa axis represents a brightness component of the R value, G value or B value, while the ordinate axis represents a frequency (the number of pixels).

Figure 4C:
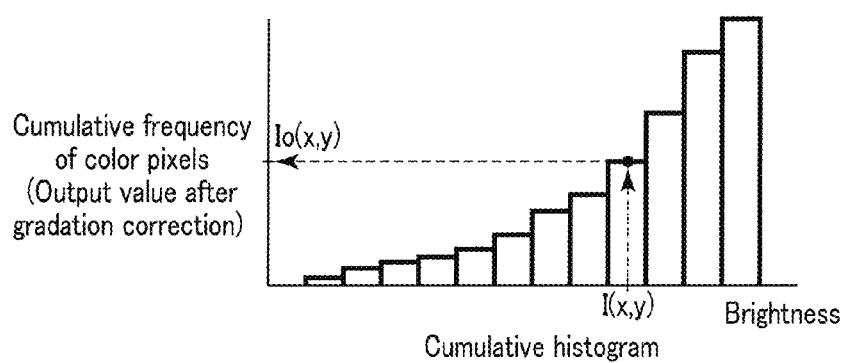
FIG. 4C is a cumulative histogram generated by the correction coefficient calculator of the imaging apparatus.

The correction coefficient calculator 201 cumulates the local area histograms generated for the pixels of interest of the input image I, and generates a cumulative histogram, such as that shown in FIG. 4C. In the cumulative histogram shown in FIG. 4C, the abscissa axis represents a brightness component of the R value, G value or B value. The ordinate axis represents the cumulative frequency of color pixels (cumulative pixel number) corresponding to the brightness components of the R value, G value or B value, or an output value after gradation correction (histogram equalization) of color pixels corresponding to the R value, G value or B value. When gradation correction (histogram equalization) is performed based on the cumulative histogram, known image processing technology may be used.

Based on the cumulative histogram, the correction coefficient calculator 201 calculates correction coefficients (gain coefficients) corresponding to the R value, G value and B value of a pixel of interest, namely, gain R, gain G and gain B.

Let us assume that the R value, G value and B value of a pixel of interest (x,y) are I_r(x,y), I_g(x,y) and I_b(x,y), respectively. The R value, G value and B value calculated based on the cumulative histogram shown in FIG. 4C and corresponding to the corrected output image (corrected image RP) are assumed to be Io_r(x,y), Io_g(x,y) and Io_b(x,y), respectively.

Correction coefficients gain R, gain G and gain B are given as follows:

$$\text{gain } R = Io\_r(x,y)/I\_r(x,y) \quad (2)$$

$$\text{gain } G = Io\_g(x,y)/I\_g(x,y) \quad (3)$$

$$\text{gain } B = Io\_b(x,y)/I\_b(x,y) \quad (4)$$

The correction coefficient calculator 201 calculates correction coefficients gain R, gain G and gain B for histogram equalization of the local area, for each of the pixels of the input image I. The correction coefficients gain R, gain G and gain B are gain coefficients, which are multipliers applied to the color channels R, G and B of the pixels of the input image I.

The correction coefficients gain R, gain G and gain B are calculated in accordance with the pixel information (such as a histogram, a maximal value and a minimal value) of a designated local area having a pixel of interest at the center.

The correction coefficient calculator 201 supplies the calculated correction coefficients gain R, gain G and gain B to the contrast correction unit 202.

The contrast correction unit (adaptive gradation correction unit) 202 performs adaptive gradation correction (contrast correction) corresponding to the mist component H(x,y) of the input image I, based on the mist component H(x,y) estimated by the mist component estimation unit 200 and the correction coefficients gain R, gain G and gain B calculated by the correction coefficient calculator 201. To be more specific, the contrast correction unit 202 receives the mist component H(x,y) estimated by the mist component estimation unit 200 and the correction coefficients gain R, gain G and gain B calculated by the correction coefficient calculator 201 and performs contrast correction (multiplication each of the pixels of the input image I by a gain) based on the mist component H(x,y) and the correction coefficients gain R, gain G and gain B.

Figure 5:
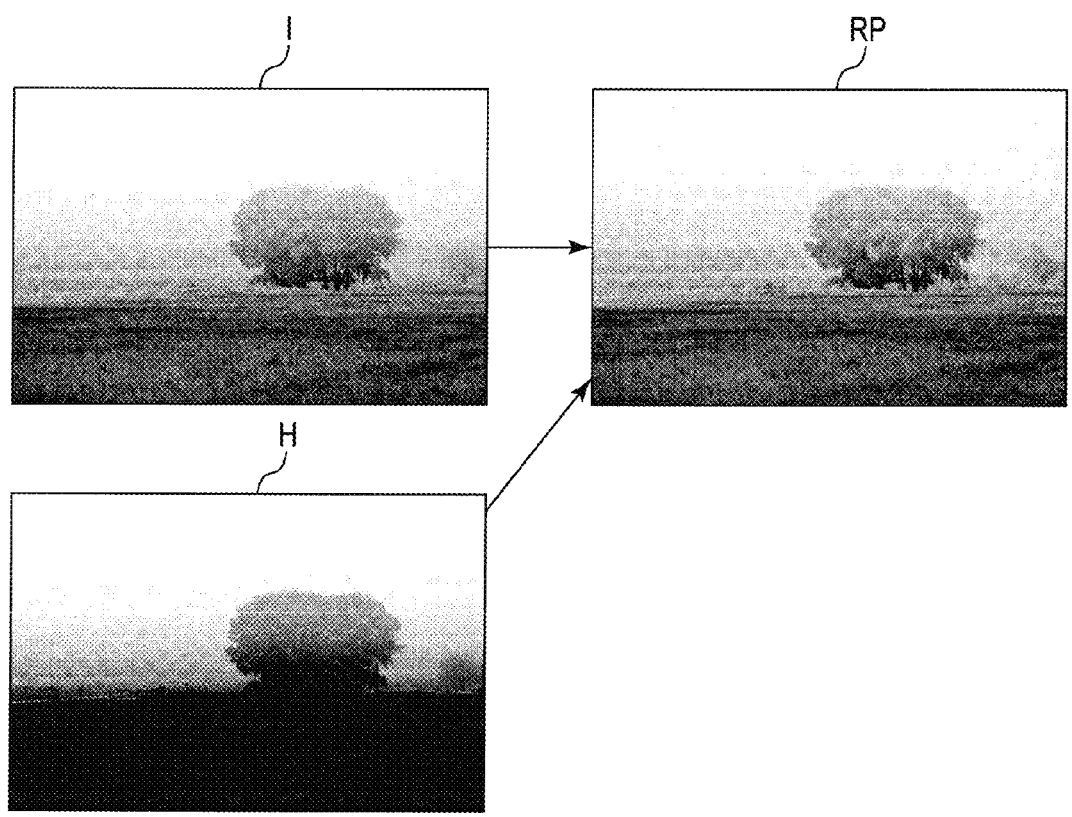
FIG. 5 shows schematic diagrams illustrating how the contrast correction unit of the imaging apparatus performs a contrast correction operation.

As shown in FIG. 5, the contrast correction unit 202 adjusts the correction coefficients gain R, gain G and gain B in accordance with the mist component H(x,y) of each of the pixels of the input image I. The contrast correction unit 202 multiplies the pixel values of the pixels by the adjusted correction coefficients gain R, gain G and gain B, thereby producing a corrected image RP whose contrast is corrected.

The contrast correction unit 202 maintains the original values of the correction coefficients gain R, gain G and gain B for a dense mist region of the input image I, i.e., a region having a high brightness and a low saturation.

The contrast correction unit 202 adjusts the correction coefficients gain R, gain G and gain B to be close to 1.0 for a light mist region of the input image I, i.e., a region having a low brightness or a high saturation.

To be specific, the contrast correction unit 202 normalizes (or weights) the correction coefficients gain R, gain G and gain B calculated by the correction coefficient calculator 201, based on the mist component H(x,y) estimated by the mist component estimation unit 200. The contrast correction unit 202 performs contrast correction for each of the pixels, using correction coefficients gain R', gain G' and gain B' which are adjusted by weighting. The contrast correction unit 202 includes a normalization coefficient calculator 202a and a coefficient converter 202b.

The normalization coefficient calculator 202a calculates a normalized coefficient by normalizing or weighting the mist component H(x,y) estimated by the mist component estimation unit 200.

The coefficient converter 202b converts the correction coefficients gain R, gain G and gain B calculated by the correction coefficient calculator 201 into weighted gains R', gain G' and gain B', based on the normalization coefficients calculated by the normalization coefficient calculator 202a.

The coefficient converter 202b performs conversion of the correction coefficients gain R, gain G and gain B calculated by the correction coefficient calculator 201 in such a manner that the larger the normalization coefficients calculated by the normalization coefficient calculator 202a are, the closer to the original values the converted correction coefficients become. The coefficient converter 202b performs conversion of the correction coefficients gain R, gain G and gain B in such a manner that the smaller the normalization coefficients are, the closer to 1.0 the converted correction coefficients become.

Assuming that the correction strength parameter is denoted as "Strength", the correction coefficients gain R', gain G' and gain B' adjusted by weighting are given as follows:

$$\text{gain } R' = 1.0 + (\text{gain}R - 1.0) * H(x,y)/255 * \text{Strength} \quad (5)$$

$$\text{gain } G' = 1.0 + (\text{gain}G - 1.0) * H(x,y)/255 * \text{Strength} \quad (6)$$

$$\text{gain } B' = 1.0 + (\text{gain}B - 1.0) * H(x,y)/255 * \text{Strength} \quad (7)$$

By these correction coefficients gain R', gain G' and gain B', the mist component H(x,y) takes on a large value in a region having a high brightness and a low saturation. As a result, the original values of gain R, gain G and gain B can be maintained as the values of gain R', gain G' and gain B'.

In a region having a low brightness and a high saturation, the mist component H(x,y) takes on a small value. As a result, correction coefficients gain R', gain G' and gain B' are adjusted to be close to 1.0.

The contrast correction is performed for each of the pixels, using correction coefficients gain R', gain G' and gain B' which are adjusted by weighting. The contrast correction performed for each of the pixels is given as follows:

$$I'\_r(x,y) = I\_r(x,y) * \text{gain } R' \quad (8)$$

$$I'\_g(x,y) = I\_g(x,y) * \text{gain } G' \quad (9)$$

$$I'\_b(x,y) = I\_b(x,y) * \text{gain } B' \quad (10)$$

The compression unit 110 performs such known compression processing as JPEG and MPEG for a digital image signal supplied from the mist correction unit 109, and supplies the resultant compressed signal to the output unit 111.

The output unit 111 stores the compressed digital image signal supplied thereto from the compression unit 110, in a memory card or the like. Alternatively, the output unit 111 may forward the compressed digital image signal supplied thereto from the compression unit 110, to a display provided independently.

The controller 112 is a microcomputer or the like. The controller 112 exchanges data with the A/D converter 104, the photometric evaluator 106, the lens controller 107, the signal processor 108, the mist correction unit 109, the compression unit 110 and the output unit 111, and controls the A/D converter 104, the photometric evaluator 106, the lens controller 107, the signal processor 108, the mist correction unit 109, the compression unit 110 and the output unit 111. An external I/F section 113 is connected to the controller 112. The external I/F section 113 includes a power supply switch, a shutter button, and an interface for switching modes among "photography", "recording" and "reproduction." The interface for switching modes among "photography", "recording" and "reproduction" may include, for example, a photographing button, a recording button and a reproduction button.

Next, the operation of the imaging apparatus 1 having the above-mentioned configuration will be described with reference to the photographing operation flowchart shown in FIG. 6.

When an operator operates the external I/F section 113, the external I/F section 113 sends various setting information regarding the input photographing operation (e.g., header information) to the controller 112 in step S1.

When the photographing button of the external I/F 113 is depressed, the controller 112 switches to the photographing mode.

When an optical image from the lens system 100 is incident on the image sensor 102 in the photographing mode, the image sensor 102 receives the optical image from the lens system 100, performs photoelectric conversion for the optical image, and outputs an analog image signal. The analog image signal is supplied to the A/D converter 104. The A/D converter 104 converts the analog image signal output from the image sensor 102 into a digital image signal, and supplies this digital image signal to the buffer 105. The buffer 105 temporarily stores the digital image signal supplied from the A/D converter 104.

In step S2, the signal processor 108 performs image processing for the digital image signal stored in the buffer 105, including known interpolation processing, WB correction processing and noise reduction processing. The signal processor 108 supplies the digital image signal subjected to the image processing to the mist correction unit 109.

In step S3, the mist correction unit 109 receives the digital image signal supplied from the signal processor 108 and performs contrast emphasis correction for the digital image signal such that the contrast of a low-contrast portion caused by the mist or the like is emphasized.

To be specific, the mist correction unit 109 performs mist component correction in accordance with the mist component correction flowchart shown in FIG. 7. In step S10, the mist component estimation unit 200 receives a digital image signal supplied from the signal processor 108 and estimates the gradation of a mist component based on the received digital image signal. To be specific, the mist component estimation unit 200 scans the inside region of a predetermined scan region F with respect to the input image I acquired from the digital image signal, as shown in FIG. 3A. The mist component estimation unit 200 calculates min (Ir, Ig, Ib) according to formula (1) for each of the scan regions F of the pixels of interest of the input image I, and regards the calculated min(Ir, Ig, Ib) as a mist component H(x,y).

The mist component H(x,y) takes on a larger value in accordance with an increase in the mist density, and takes on a smaller value in accordance with a decrease in the mist density. That is, the mist component H(x,y) takes on a large value in a region having a high brightness and a low saturation, as in the image of the mist component H(x,y) shown in FIG. 3B. In other words, in a region having a low brightness or a high saturation, the mist component H(x,y) takes on a small value.

In step S11, the correction coefficient calculator 201 calculates a correction coefficient for contrast emphasis with respect to a region whose contrast is low due to the high-brightness, low-saturation mist component of the input image I.

To be more specific, the correction coefficient calculator 201 scans the inside region of the local area E of the input image, as shown in FIG. 4A. By scanning the inside region of the local area E, the correction coefficient calculator 201 generates histograms (local area histograms) of the R value, G value and B value of the local area E, the center of which is a pixel of interest, as shown in FIG. 4B. The histograms are generated for the pixels of interest.

The correction coefficient calculator 201 cumulates the local area histograms generated for the pixels of interest, and generates a cumulative histogram, such as that shown in FIG. 4C.

Based on the cumulative histogram, the correction coefficient calculator 201 calculates correction coefficients (namely, gain R, gain G and gain B) corresponding to the R value, G value and B value of a pixel of interest, according to formulas (2) to (4).

The correction coefficient calculator 201 supplies the calculated correction coefficients gain R, gain G and gain B to the contrast correction unit 202.

In step S12, the contrast correction unit 202 receives the mist component H(x,y) estimated by the mist component estimation unit 200 and the correction coefficients gain R, gain G and gain B calculated by the correction coefficient calculator 201, and performs contrast correction (multiplication each of the pixels of the input image I by a gain) based on the mist component H(x,y) and the correction coefficients gain R, gain G and gain B.

For example, the contrast correction unit 202 maintains the values of the correction coefficients gain R, gain G and gain B for a dense mist region of the input image I, i.e., a region having a high brightness and a low saturation.

The contrast correction unit 202 adjusts the correction coefficients gain R, gain G and gain B to be close to 1.0 for a light mist region, i.e., a region having a low brightness or a high saturation.

In this manner, the contrast correction unit 202 adjusts the correction coefficients gain R, gain G and gain B in accordance with the mist component H(x,y) of each of the pixels of the input image I. The contrast correction unit 202 multiplies the pixel values of the pixels by the adjusted correction coefficients gain R', gain G' and gain B', thereby producing a corrected image RP whose contrast is corrected in accordance with the mist component H(x,y).

To be more specific, the contrast correction unit 202 weights the correction coefficients gain R, gain G and gain B in accordance with the mist component H(x,y), as shown in formulas (5) to (7). The contrast correction unit 202 performs contrast correction for each of the pixels, using correction coefficients gain R', gain G' and gain B' which are adjusted by weighting.

The contrast correction unit 202 performs contrast correction for each of the pixels, using correction coefficients gain R', gain G' and gain B' which are adjusted by weighting, according to formulas (8) to (10). By this contrast correction, contrast-corrected pixel values I'_r(x,y), I'_g(x,y) and I'_b(x,y) are calculated.

In step S4, the compression unit 110 performs such known compression processing as JPEG and MPEG for a digital image signal supplied from the mist correction unit 109, i.e., for a digital image signal whose mist component is corrected, and supplies the resultant compressed signal to the output unit 111.

In step S5, the output unit 111 stores the compressed digital image signal supplied thereto from the compression unit 110, in a memory card or the like. Alternatively, the output unit 111 forwards the compressed digital image signal supplied thereto from the compression unit 110, to a display provided independently.

As described above, the first embodiment employs a mist correction unit 109 which performs contrast emphasis correction for a digital image signal such that the contrast of a low-contrast portion caused by the mist or the like is emphasized. The mist correction unit 109 maintains the values of the correction coefficients gain R, gain G and gain B for a dense mist region of the input image I, i.e., a region having a high brightness and a low saturation. The mist correction unit 109 adjusts the correction coefficients gain R, gain G and gain B to be close to 1.0 for a light mist region, i.e., a region having a low brightness or a high saturation. In this manner, the contrast of a region whose contrast is lowered by the mist can be emphasized in accordance with the density of the mist.

According to the first embodiment, the gradation of a mist component (the degree of degradation) is estimated, and adaptive gradation correction can be performed in accordance with the gradation of the mist component H(x,y) (the degree of degradation). As a result, a corrected image RP can be obtained, which is improved in recognizability even at a mist region (a region with a high degree of degradation).

Second Embodiment

The second embodiment of the present invention will now be described with reference to the accompanying drawings. The second embodiment has a configuration similar to that shown in FIG. 1, and differs from the first embodiment in terms of the internal configuration of the mist correction unit 109. In FIG. 8, like reference numerals denote like parts in FIG. 2, and a detailed description of such parts will be omitted.

FIG. 8 is a block diagram illustrating a mist correction unit 109 employed in an imaging apparatus to which an image processing apparatus is applied. The mist correction unit 109 of the second embodiment differs from the mist correction unit 109 of the first embodiment in that a color space converter 203 is additionally employed.

The color space converter 203 has an output terminal connected to a mist component estimation unit 200. The color space converter 203 is connected to a controller 112. The color space converter 203 exchanges data with the controller 112, and the operation of the color space converter 203 is controlled by the controller 112.

The color space converter 203 receives a digital image signal from a signal processor 108 and converts it into a signal of a YCbCr (brightness signal and color-difference signal) color space or a signal of an HSV (hue signal, saturation signal and value signal) color space. The color space converter 203 supplies a digital image signal of either the YCbCr color space or the HSV color space to the mist component estimation unit 200.

The mist component estimation unit 200 receives the digital image signal of either the YCbCr color space or the HSV color space from the color space converter. The mist component estimation unit 200 estimates a mist component based on the brightness signal Y, color-difference signal (saturation signal) CbCr, etc.

Figure 9:
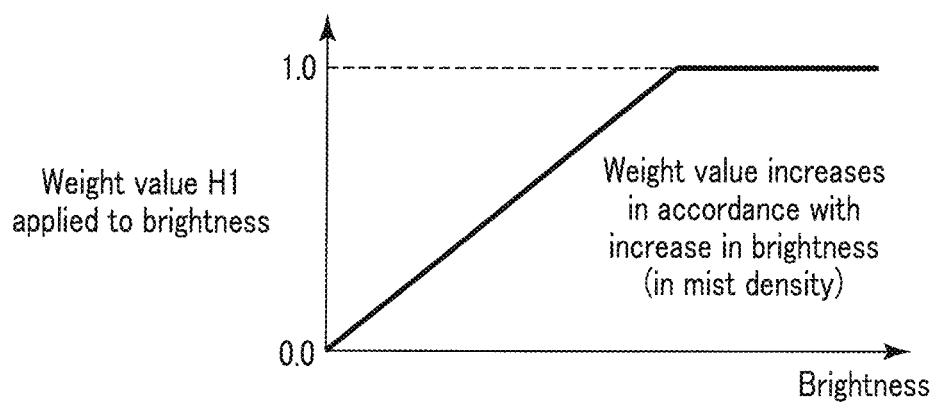
FIG. 9 is a graph illustrating how a weight is determined for a brightness signal used in the mist correction unit of the imaging apparatus.

FIG. 9 illustrates weight value H1 applied to the brightness Y. The weight value H1 applied to the brightness Y is in the range of 0.0 to 1.0. The weight value H1 increases in accordance with an increase in the brightness. In other words, the weight value H1 increases in accordance with an increase in the value of mist component (the density of mist).

Figure 10:
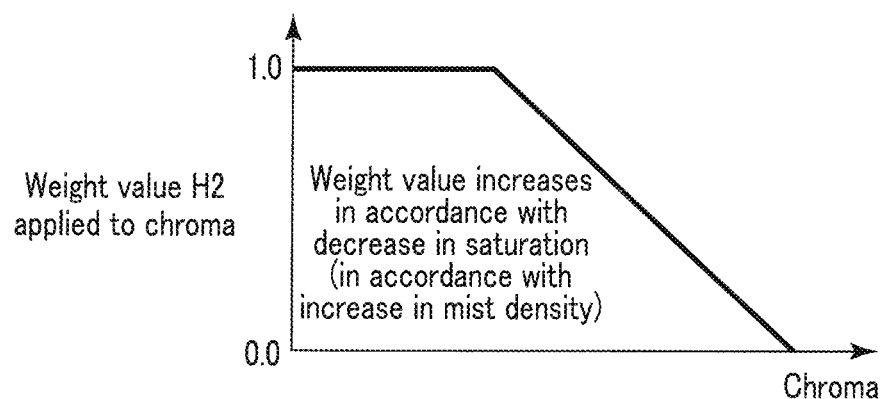
FIG. 10 is a graph illustrating how a weight is determined for a saturation signal used in the mist correction unit of the imaging apparatus.

FIG. 10 illustrates weight value H2 applied to the saturation CbCr. The weight value H2 applied to the saturation is in the range of 0.0 to 1.0. The weight value H2 increases in accordance with a decrease in the saturation. In other words, the weight value H2 increases in accordance with an increase in the value of mist component (the density of mist).

From the relations between the brightness Y and the saturation CbCr, the mist component estimation unit 200 calculates the mist component H, for example, according to the following formula:

$$H = H1 * H2 \qquad (11)$$

The brightness Y and the saturation CbCr are calculated as follows:

In the case of the YCbCr color space, the brightness is Y, and the saturation is $(Cb^2 + Cr^2)^{1/2}$.

In the case of the HSV color space, the brightness is V, and the saturation is S.

Next, a description will be given of a mist correction operation performed by the mist correction unit 109 having the above configuration.

The color space converter 203 converts a digital image signal into a signal of the YCbCr color space or a signal of the HSV color space, and supplies the digital image signal of either the YCbCr color space or the HSV color space to the mist component estimation unit 200.

The mist component estimation unit 200 receives the digital image signal of either the YCbCr color space or the HSV color space from the color space converter 203 and estimates a mist component based on the brightness signal Y, color-difference signal (saturation signal) CbCr, etc. of the digital image signal.

The correction coefficient calculator 201 calculates correction coefficients gain R, gain G and gain B for contrast emphasis with respect to a low-contrast region of the input image I.

The contrast correction unit 202 receives the mist component H estimated by the mist component estimation unit 200 and the correction coefficients gain R, gain G and gain B calculated by the correction coefficient calculator 201, and weights the correction coefficients gain R, gain G and gain B in accordance with the value of the mist component H(x,y) according to formulas (5) to (7), as in the first embodiment.

The contrast correction unit 202 performs contrast correction by multiplying each of the pixels of the input image I by correction coefficients gain R', gain G' and gain B', which are adjusted by weighting.

According to the second embodiment, the color space converter 203 is provided for converting an RGB image signal supplied from the image processor 108 into a signal of either the YCbCr color space or the HSV color space. The advantages of the second embodiment are substantially the same as the first embodiment.

Third Embodiment

The third embodiment of the present invention will now be described with reference to the accompanying drawings.

Figure 11:
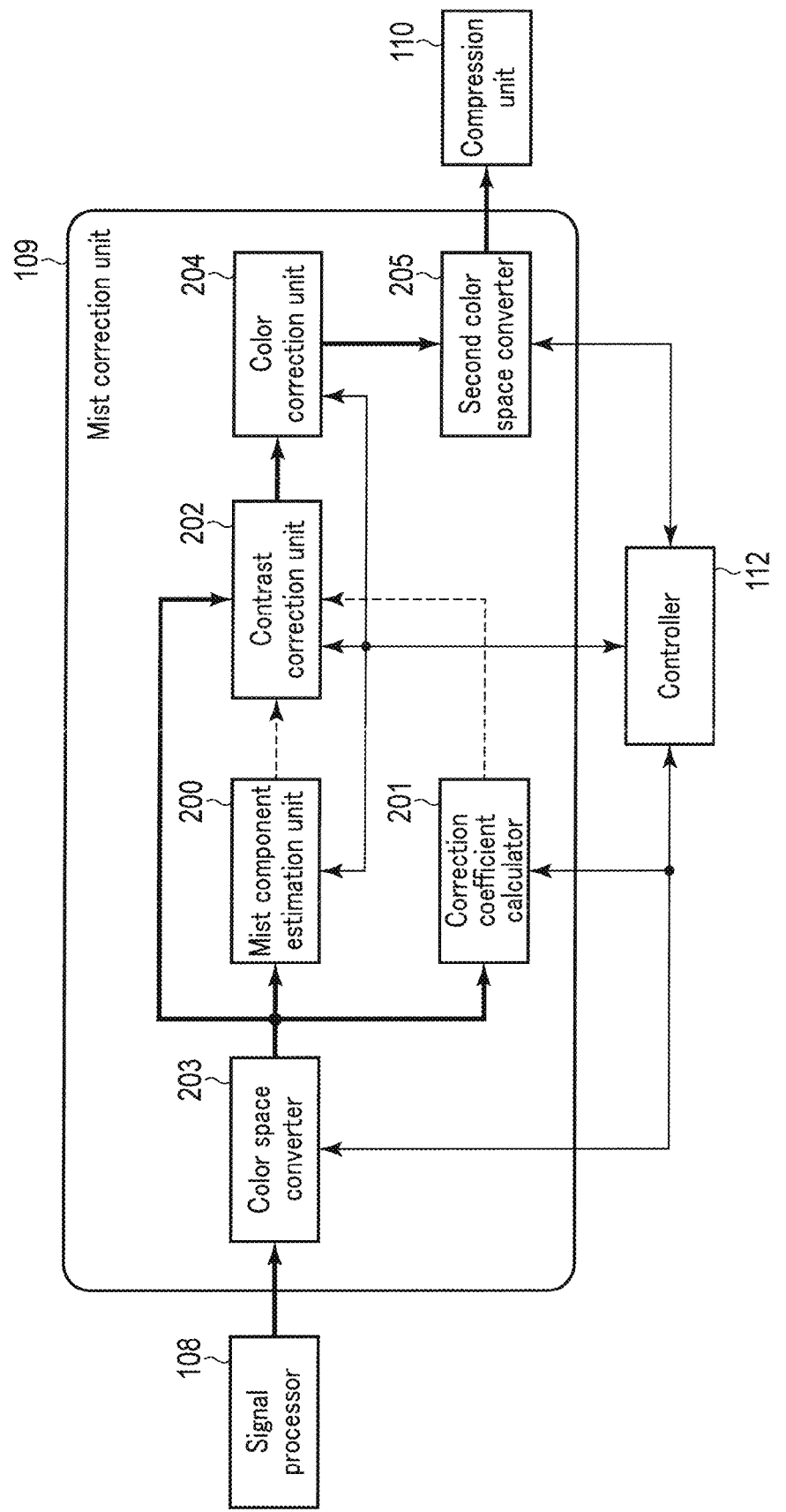
FIG. 11 is a specific block diagram illustrating the mist correction unit of an imaging apparatus according to the third embodiment of the present invention.

The third embodiment has a configuration similar to that shown in FIG. 1, and differs from the first embodiment in terms of the internal configuration of the mist correction unit 109. In FIG. 11, like reference numerals denote like parts in FIG. 8, and a detailed description of such parts will be omitted.

FIG. 11 is a block diagram illustrating a mist correction unit 109 employed in an imaging apparatus to which an image processing apparatus is applied. The mist correction unit 109 of the third embodiment differs from the mist correction unit 109 of the second embodiment in that a color correction unit 204 and a second color space converter 205 are additionally employed.

The color correction unit 204 is connected to the output terminal of a contrast correction unit 202. The second color space converter 205 is connected to the output terminal of the color correction unit 204. The color correction unit 204 and the second color space converter 205 are connected to a controller 112. The color correction unit 204 and the second color space converter 205 exchange data with the controller 112, and the operations of the color correction unit 204 and the second color space converter 205 are controlled by the controller 112.

The correction coefficient calculator 201 calculates a correction coefficient for contrast correction, by using a brightness signal Y(V) included in a digital image signal of either the YCbCr color space or the HSV color space supplied from a color space converter 203. To be specific, the correction coefficient calculator 201 calculates correction coefficient gain Y corresponding to the brightness signal Y of each of the pixels, based on the brightness histogram (such as that shown in FIG. 4B) of a local area E containing a pixel of interest at the center and having predetermined size.

The contrast correction unit 202 performs contrast correction for the brightness signal Y included in a digital image signal of either the YCbCr color space or the HSV color space supplied from the color space converter 203. The contrast correction unit 202 performs contrast correction for the brightness signal Y, based on the mist component H(x,y) supplied from a mist component estimation unit 200 and a correction coefficient gain Y supplied from the correction coefficient calculator 201.

The contrast correction performed for the brightness signal is given as follows:

$$\text{gain } Y' = 1.0 + (\text{gain } Y - 1.0) * H(x,y)/255 * \text{Strength} \quad (11)$$

By this formula, an adjusted correction coefficient gain Y' is calculated.

The contrast correction is performed according to the following formula:

$$Y'(x,y) = Y(x,y) * \text{gain } Y' \quad (12)$$

The contrast correction unit 202 supplies the brightness signal Y' subjected to the contrast correction and a color-difference signal (saturation signal) CbCr to the color correction unit 204.

The color correction unit 204 calculates a saturation correction coefficient in accordance with the correction coefficient gain Y' adjusted by the contrast correction unit 202, and performs saturation emphasis processing for the color-difference signal (saturation signal) of each of the pixels.

FIG. 12 is a saturation correction coefficient applied to the correction coefficient gain Y'. The saturation correction coefficient increases the saturation emphasis in accordance with a decrease in the value of gain Y'. In FIG. 12, the saturation correction coefficient increases from 1.0 to 2.0 in accordance with a decrease in the value of gain Y'. Where the gradation is extended for a pixel having a high brightness, the correction coefficient gain Y' described above tends to be less than 1.0. If a gain coefficient (correction coefficient gain Y') which is less than 1.0 is used as a multiplier, the saturation of an image subjected to contrast correction lowers.

For this reason, the color correction unit 204 performs saturation correction in accordance with a gain coefficient (correction coefficient gain Y') after performing contrast correction for the brightness signal of each of the pixels. To be specific, when the correction coefficient gain Y' is less than 1.0, the color correction unit 204 multiplies saturation CbCr (or S) by a gain coefficient larger than 1.0 (saturation correction coefficient) in accordance with the value of the correction coefficient gain Y', thereby emphasizing the saturation CbCr (or S).

The second color space converter 205 converts a digital image signal of a YCbCr (brightness signal and color-difference signal) color space or a digital image signal of an HSV (hue signal, saturation signal and value signal) color space into an RGB digital image signal.

In the mist correction unit 109 having this configuration, the color correction unit 204 calculates a saturation correction coefficient in accordance with the correction coefficient gain Y' adjusted by the contrast correction unit 202, and performs saturation emphasis processing for the color-difference signal (saturation signal) of each of the pixels. The saturation is emphasized in such a manner that the smaller the correction coefficient gain Y' is, the more the saturation emphasis increases.

The second color space converter 205 converts a digital image signal of a YCbCr (brightness signal and color-difference signal) color space or a digital image signal of an HSV (hue signal, saturation signal and value signal) color space into an RGB digital image signal.

According to the third embodiment described above, the color correction unit 204 is provided, which calculates a saturation correction coefficient in accordance with the correction coefficient gain adjusted by the contrast correction unit 202, and performs saturation emphasis processing for the color-difference signal (saturation signal) of each of the pixels. Accordingly, the contrast correction can be performed in accordance with the mist component H(x,y). As a result, a contrast-corrected image RP of high quality can be obtained.

The present invention is not limited to the above embodiments and may be modified as follows:

In the above embodiments, the mist component H(x,y) is regarded as a factor contributing to a degree of degradation, but this is not restrictive. Contrast correction may be performed for the mist component, fog component and white component of image data.

In the above embodiments, processing is executed by hardware, but this is not restrictive. For example, an image signal output from the signal processor 108 may be processed by software.

In the above embodiments, the mist component estimation and the correction coefficient calculation are performed for each of the pixels of an image signal received from the signal processor 108, but this is not restrictive. For example, the image signal can be first reduced in size, and then the mist component estimation and the correction coefficient calculation may be performed for such a reduced image signal. When the mist component estimation and the correction coefficient calculation are performed for a reduced image, the mist component and the correction coefficient are enlarged to the original size by performing known interpolation processing (such as bilinear interpolation or bicubic interpolation) at the time of contrast correction. Thereafter, contrast correction can be performed using the enlarged mist component and correction coefficient.

The present invention is not limited to the embodiments described above and can be modified in various manners in practice without departing from the gist of the invention. In addition, various inventions can be made by properly combining the structural elements disclosed in connection with the embodiments. For example, some of the structural elements may be deleted from each of the embodiments. Furthermore, structural elements of different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a degree-of-degradation detector which detects a degree of degradation of image quality for each of areas included in image data and having predetermined size;
   a correction coefficient calculator which calculates a correction coefficient for gradation correction, for each of the areas of the image data; and
   an adaptive gradation correction unit which performs adaptive gradation correction appropriate to the degree of degradation of the image data, based on the degree of degradation detected by the degree-of-degradation detector and the correction coefficient calculated by the correction coefficient calculator,
   wherein the correction coefficient calculator calculates, as the correction coefficient, a gain coefficient for contrast emphasis for a pixel of interest of the image data, and
   wherein the adaptive gradation correction unit weights the correction coefficient calculated by the correction coefficient calculator, based on the degree of degradation detected by the degree-of-degradation detector, the correction coefficient being weighted such that the larger the degree of degradation is, the closer to an original value the gain coefficient becomes, and such that the smaller the degree of degradation is, the smaller an effect of the adaptive gradation correction becomes.

2. The image processing apparatus according to claim 1, wherein the image data comprises a plurality of pieces of pixel data;
   the pixel data comprises a plurality of color channels; and
   the degree-of-degradation detector compares values of the colors channels with each other in an area of the image data including a pixel of interest of the image data, selects a color channel of a minimal value, and detects the degree of degradation based on the minimal value.

3. The image processing apparatus according to claim 2, wherein the color channels include an R value, a G value and a B value, and
   the degree-of-degradation detector selects the R value, the G value or the B value such that the selected value is a minimal value among the R value, the G value and the B value.

4. The image processing apparatus according to claim 1, wherein the adaptive correction unit includes:
   a normalization coefficient calculator which calculates a normalized coefficient by weighting the degree of degradation detected by the degree-of-degradation detector; and
   a coefficient converter which converts the correction coefficient calculated by the correction coefficient calculator, based on the normalization coefficient calculated by the normalization coefficient calculator.

5. The image processing apparatus according to claim 1, wherein the degree of degradation includes factors related to a contrast and a saturation of each of the areas of the image data.

6. The image processing apparatus according to claim 5, wherein the degree of degradation represents high-brightness and low-saturation components, including a mist component, a haze component and a cloud component.

7. The image processing apparatus according to claim 6, wherein the adaptive gradation correction unit weights the correction coefficient calculated by the correction coefficient calculator in accordance with a value of the mist component, the haze component or the cloud component and performs contrast correction for each of the pixels of the image data, using a weighted correction coefficient.

8. The image processing apparatus according to claim 1, wherein the correction coefficient calculator generates histograms of brightness components of respective pixel values in a local area of the image data, generates a cumulative histogram by cumulating the histograms, and calculates a correction coefficient for each of the pixel values based on the cumulative histogram.

9. The image processing apparatus according to claim 1, further comprising:
   a color space converter which converts the image data into a YCbCr-color-space signal or an HSV-color-space signal,
   wherein the degree-of-degradation detector detects the degree of degradation based on a brightness and a saturation of the YCbCr-color-space signal or HSV-color-space signal, obtained by the color space converter.

10. The image processing apparatus according to claim 9, wherein the degree-of-degradation detector includes a first weight value applied to the brightness and a second weight value applied to the saturation,
    the first weight value increases in accordance with an increase in the brightness, and the second weight value increases in accordance with a decrease in the saturation, and
    the degree-of-degradation detector calculates the degree of degradation based on a relation between the brightness and the saturation.

11. The image processing apparatus according to claim 1, further comprising:
    a color correction unit which calculates a saturation correction coefficient in accordance with the correction coefficient adjusted by the adaptive gradation correction unit, and which performs saturation emphasis for the image data based on the saturation correction coefficient.

12. The image processing apparatus according to claim 11, wherein the color correction unit emphasizes the saturation by multiplying the saturation by the saturation correction coefficient of 1.0 or greater in accordance with the correction coefficient where the correction coefficient is smaller than 1.0.

13. The image processing apparatus according to claim 11, wherein the saturation correction coefficient emphasizes the saturation strongly in accordance with a decrease in the correction coefficient.

14. An imaging apparatus comprising:
an imaging element which forms an optical image of an object;
an image processing apparatus as defined in claim 1, the image processing apparatus being configured to detect a degree of degradation of image quality of image data obtained by the imaging element, and to perform adaptive gradation correction in accordance with the degree of gradation of the image data; and
an output unit which outputs the image data subjected to the gradation correction performed by the image processing apparatus.

15. An image processing method comprising:
detecting a degree of degradation of image quality for each of areas included in image data and having predetermined size;
calculating, as a correction coefficient, a gain coefficient for contrast emphasis for a pixel of interest of the image data; and
performing adaptive gradation correction appropriate to the degree of degradation of the image data, by weighting the correction coefficient based on the degree of degradation and the correction coefficient, the correction coefficient being weighted such that the larger the degree of degradation is, the closer to an original value the gain coefficient becomes, and such that the smaller the degree of degradation is, the smaller an effect of the adaptive gradation correction becomes.

16. A computer-processable non-transitory storage medium storing an image processing program that causes a computer to perform:
a degree-of-degradation detecting function of detecting a degree of degradation of image quality for each of areas included in image data and having predetermined size;
a correction coefficient calculating function of calculating, as a correction coefficient, a gain coefficient for contrast emphasis for a pixel of interest of the image data; and
adaptive gradation correction function of performing adaptive gradation correction appropriate to the degree of degradation of the image data, by weighting the correction coefficient based on the degree of degradation and the correction coefficient, the correction coefficient being weighted such that the larger the degree of degradation is, the closer to an original value the gain coefficient becomes, and such that the smaller the degree of degradation is, the smaller an effect of the adaptive gradation correction becomes.

* * * * *